Aug. 4, 1953    L. E. GREEN    2,647,619
BELT CLEANER
Filed Aug. 7, 1948    2 Sheets-Sheet 2
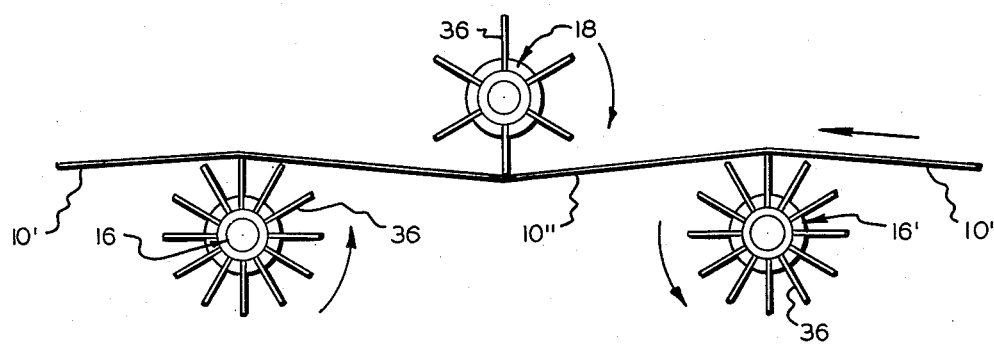
FIG. III.
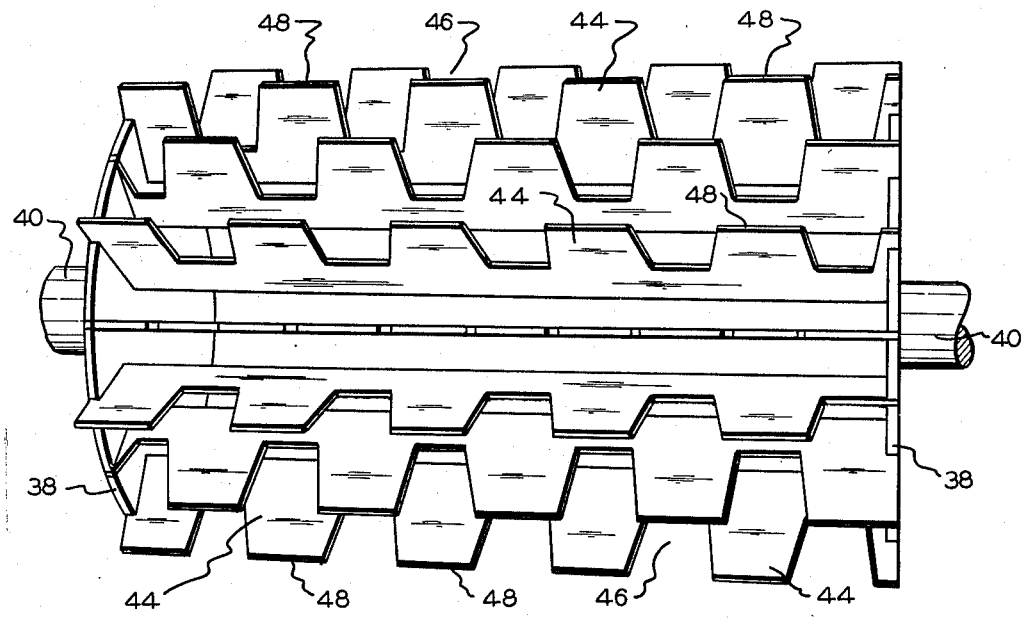
FIG. IV.
Inventor
LORAN E. GREEN
By Beaman & Patch Patented Aug. 4, 1953

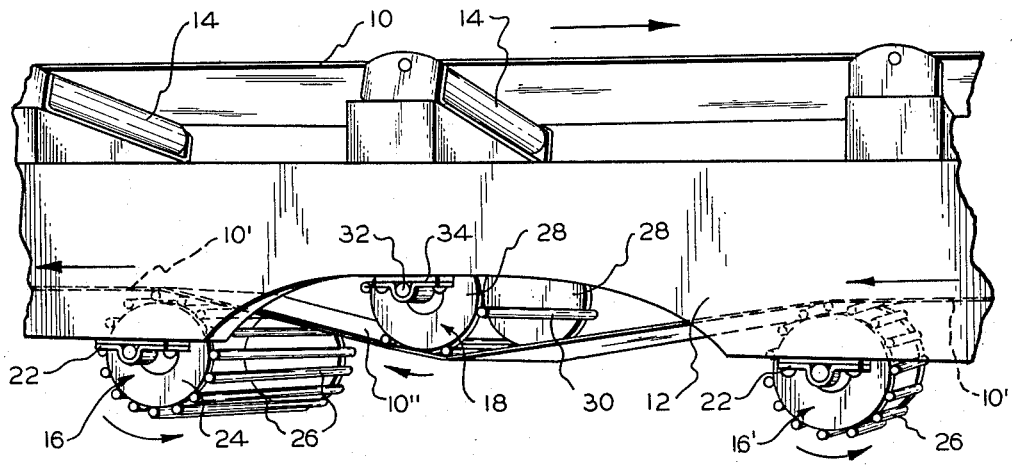
FIG. I.
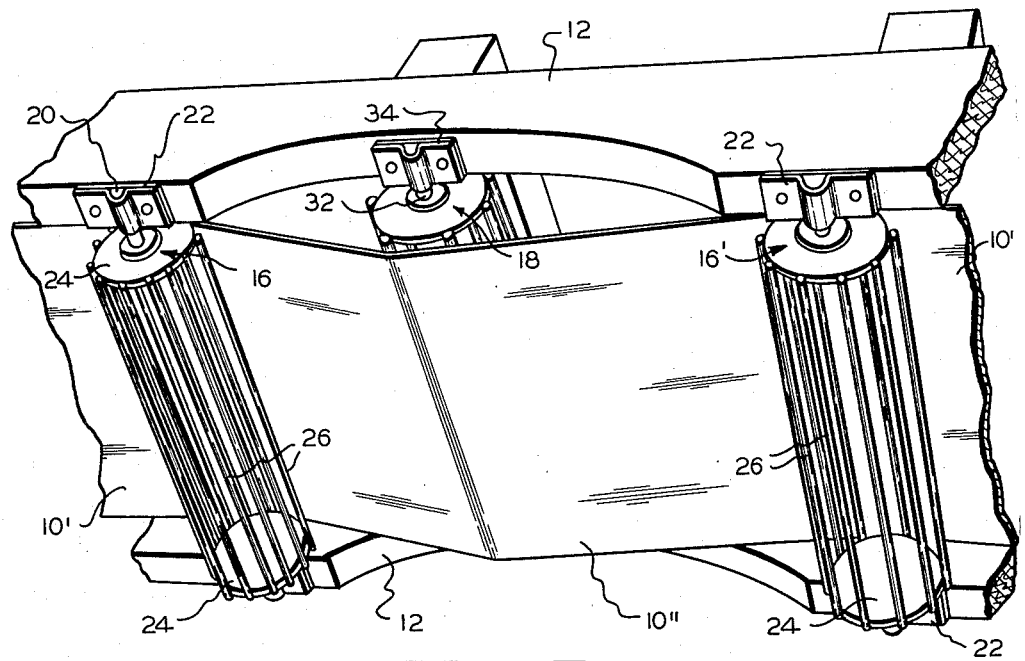
FIG. II.
Inventor
LORAN E. GREEN
By Beaman & Patch

2,647,619

UNITED STATES PATENT OFFICE 2,647,619

BELT CLEANER

Loran E. Green, Port Huron, Mich.

Application August 7, 1948, Serial No. 43,032

1 Claim. (Cl. 198—230)

This invention relates to belt or apron conveyors for coal and other material, such as sand and gravel, which has a tendency to stick to the belt or apron surface and be carried back on the return run thereof.

The endless belt or apron conveyors hitherto employed to feed crushed wet coal to boiler hoppers are open to the objection that some of the fed coal, including in particular the dust and sludge, adheres to the belt or apron surface and is carried back to the feeding station on the return run thereof. The same objection exists against the endless belt or apron conveyor installations as at present employed to convey sand, gravel and other material which has a tendency to adhere to the belt or apron surface and it will be appreciated, therefore, that the invention is not to be regarded as limited to coal conveyors but is capable of application to belt or apron conveyors generally when employed to convey material which tends to become adherent to the belt or apron surface.

It is the object of the present invention to overcome the above stated objection by providing simple yet efficient means for operative association with a conveyor belt or apron to rid the same of any adherent material.

A particular object of the invention is to provide means for operative association with the return run of an endless belt or apron conveyor so as to intermittently beat or whip the belt or apron to cause material adherent thereto to be dislodged and discharged prior to the arrival of the return run at the loading station.

Still a further and important object of the invention is to provide roll means for subjecting a portion of the return run of a conveyor belt or apron to intermittent beating and paring actions performed upon the opposite surfaces of the said conveyor belt or apron portion, to remove any material adherent to the belt or apron return run, and to so construct and arrange said roll means that the same are capable of being actuated by the motion of the belt or apron between them, whereby the provision of separate power means for actuating such roll means is unnecessary and undue wear on the conveyor belt or apron is thereby avoided.

These and further objects and advantages residing in the construction and use of the invention will appear clear from a consideration of the following description of some practical forms of the invention, given by way of example only, and with reference to the accompanying drawings in which:

Fig. I is a fragmentary perspective and side elevational view of a conveyor belt or apron installation equipped with cleaning apparatus in accordance with the invention.

Fig. II is an underneath perspective plan view of Fig. I,

Fig. III is a side elevational view, somewhat diagrammatic in character, and showing a modified form of the belt or apron cleaner rolls, the latter having radial blades in varying numbers for the respective rolls, and Fig. IV is a perspective side elevational view of a preferred construction of the roll members employed to engage the outside surface of the conveyor belt or apron to engage and remove the adherent material thereof, in conjunction with the operation of the beating or whipping roll, this preferred roll construction possessing the advantage that it is completely hollow so that the removed material cannot pack therein.

Referring to the drawings and first to Figures I and II, the endless belt or apron conveyor is indicated at 10, 10' in association with a framework 12 carrying the transverse rolls 14 for supporting the upper run 10 of the conveyor with the material carried thereby.

The conveyor belt or apron is normally made of rubber but may be of woven fabric or other material, suitably impregnated if necessary.

The conveyor serves to carry wet crushed coal or other material from a loading station (not shown) for discharge over the head pulley or drum into a boiler hopper or to some other desired discharge location, as will be understood, but due to the nature of the conveyed material a layer thereof will become adherent to the outside surface of the return run 10'.

The object of the invention is to remove this adherent material and to this end there are provided two outside rolls, indicated generally at 16, 16', and an intermediate roll, indicated generally at 18.

The outside rolls 16, 16', are shown with end stub axles 20, mounted in bearing brackets 22 on the underneath edge of the framework 12, and as being composed of axially spaced disc members 24 tied together about their outer peripheries by the transversely extending rods 26 disposed in circumferentially spaced and parallel relationship around the disc members.

The rolls 16, 16' are freely rotatable in their axle bearing brackets 22 and are disposed so that their rods 26 have engagement with the outside surface of the conveyor belt or apron as these rolls, as well as the intermediate roll 18, are rotated at approximately the speed of the conveyor belt or apron due to the passage of the latter between the rolls.

The roll 18 is also shown as composed of discs 28, and transverse rods 30, similar to the rolls 16, 16' and as having an axle 32 freely mounted in the bearing brackets 34.

The roll 18, however, is so disposed with respect to the inside surface of the conveyor belt or apron that it depresses the portion 10'' of the return run of the belt or apron defined by the outside rolls 16, 16' and thereby gives rise to the frictional engagement of the belt or apron with the roll rods necessary to cause the rolls to be rotated as the belt or apron passes between them. In addition this depressing of the intermediate belt or apron portion 10'' gives the latter a tautness which results in the same being violently shaken or vibrated as the roll 18 is rotated and the belt or apron portion 10'' is intermittently beaten or whipped by the contact of the successive rods 30 therewith.

In the rotation of the rolls 16, 16', their rods are successively brought into engagement with the layer of adherent material returning on the outside surface of the conveyor belt or apron and tend to tear into the layer and pare the material therefrom for discharge over the left hand side of these rolls (as seen in Figures I and II) as their successive rods 26 leave the belt or apron in their rotary movement, the removal operation being materially assisted by the beating or whipping operation of the roll 18 and being finally effected at the roll 16, which serves to remove any material remaining on the belt or apron after leaving the roll 18. To this end the number of the transverse rods 26 on the final removal roll 16 may be increased as compared with those on the first removal roll 16'.

While the construction of the rolls as shown in Figures I and II has been proven to give satisfactory results other constructions of the rolls are possible and a bladed construction thereof as shown in Figure III might conveniently be employed.

Referring, therefore, to Figure III, wherein the same general reference numerals 16, 16' and 18 have been used to denote the outside removal rolls and the intermediate beating or whipping roll respectively, each roll is shown as having a series of radial blades 36 disposed so that their peripheral edges have wiping engagement with their respective belt surfaces as they are rotated over the latter in the rotation of the rolls by the belt motion.

It has been found in practice, however, that the removal rolls 16, 16' tend to become packed with the removal material unless the rolls have entirely hollow interiors. Thus in the case of the roll construction shown in Figures I and II the axles 20 are in the form of stub axles which project only from the outside of their respective outside discs 24 so that the material removed by the action of the rods 26, and which falls between those rods, is free to drop through the rolls and out of the bottom thereof since there is no central shaft or obstruction upon which this material can collect and pack, it being appreciated that this removed material is free to fall past the intermediate roll discs 24 and that these might even be omitted, if desired.

Referring now to Fig. IV, this shows a modified and preferred construction of the removal rolls 16, 16' and involves the use of end discs 38 having central and outwardly projecting stub axles 40, by which the roll is mounted for its required free rotation by the belt motion, and a series of radial blades 42 arranged in circumferentially spaced relationship, as shown, and extending only partly into the roll interior, which is left entirely hollow and is open to a free falling of material therethrough and between the blades 42. Each of the latter has a castellated outer edge composed of the castellations 44 and the intervening recesses 46, which latter extend within the outer periphery of the end discs whereas the castellations project beyond such periphery, as is clearly shown. The outer edges 48 of these castellations provide discontinuous surfaces which simultaneously engage the adherent layer of material on the conveyor belt or apron with a sub-dividing effect to break up the layer of material with a kind of paring action as each blade passes over the belt or apron surface in its rotary movement by the belt motion. By staggering the castellations 44 on the successive blades it is ensured that the entire layer surface is broken up in the rotation of the rolls, as will be understood.

While it is preferred that the rolls 16, 16' and 18 should be mounted so as to be freely rotatable by the conveyor motion it is possible to arrange for the rolls to be driven by independent power means and/or for the rolls to be geared together, as by chain and sprockets, which might be adapted to the obtaining of differential surface speeds for the rolls.

Although the invention is not to be regarded as limited thereto, it has been found in practice that highly satisfactory results are obtainable when the rolls 16, 16' have a diameter of between 7½ to 8½''. It is believed that the resulting angle between the outside or underneath surface of the conveyor belt or apron and the delivery side of these rolls is more suited to the delivery of the freed larger material than if smaller or larger diameter rolls are employed.

Further modifications may be made in the invention, in its practical application, to suit different requirements and depending upon the material being handled by the conveyor system and this without departing from the broad principles of the invention as defined in the following claim.

I claim:

In combination with an endless belt conveyor for coal and other material, such as sand or gravel, which tends to become adherent to the returning conveyor surface after the main portion of the load has been discharged at the end of the conveyor by reversing the direction of movement of the belt, of means for cleaning said surface of such adherent materials comprising freely rotatable cylindrical like members supported upon opposite sides of the returning portion of the belt, means mounting said members for free rotation about axes transversely disposed with reference to the direction of travel of said returning belt portion with the surfaces of said belt constituting the sole means for rotation of said members, said members including a pair of surface paring and wiping members engaging with the load support surface of the returning portion of the belt and longitudinally spaced therealong a relatively short distance, said members including a belt agitating member disposed on the opposite side of the returning portion of the belt from said pair of members and being located between them and engaging with one surface of the belt to deflect the belt toward a plane in which the axes of rotation of said pair of members is located, said members being provided with circumferentially spaced transversely extending ridges with which the surfaces of the belt engage to drive said members, the surfaces of said belt having chordal-like engagement with adjacent ridges of said members during rotation, the circumferential spacing of said ridges upon the agitating member engaging with one surface of said belt being greater than the circumferential spacing of the ridges upon said pair of members engaging the other surface of said belt whereby the belt is agitated by the one member associated with the one surface and the pair of members associated with the other surface has a paring or wiping action upon the surface of the belt and the material adhering thereto, said ridges corresponding in length to the width of the belt.

LORAN E. GREEN.

References Cited in the file of this patent

UNITED STATES PATENTS

| Number | Name | Date |
|---|---|---|
| 272,324 | Renwick | Feb. 13, 1883 |
| 356,450 | Coleman | Jan. 25, 1887 |
| 1,141,861 | Bausman | June 1, 1915 |
| 1,227,919 | McGilvrey | May 29, 1917 |
| 1,330,967 | Winters | Feb. 17, 1920 |
| 1,331,484 | Carr | Feb. 24, 1920 |
| 1,571,365 | Bausman | Feb. 2, 1926 |
| 1,793,246 | Philips | Feb. 17, 1931 |
| 2,023,611 | Neuman | Dec. 10, 1935 |
| 2,157,301 | Neuman | May 9, 1939 |
| 2,216,304 | Thornton | Oct. 1, 1940 |
| 2,506,372 | MacDonald | May 2, 1950 |